United States Patent

Stefansson

[15] 3,646,567

[45] Feb. 29, 1972

[54] MULTIPLE GRID LINE APPARATUS FOR RECORDING OSCILLOGRAPHS

[72] Inventor: Rafn Stefansson, San Marino, Calif.

[73] Assignee: Bell & Howell Company, Chicago, Ill.

[22] Filed: June 1, 1970

[21] Appl. No.: 42,236

[52] U.S. Cl. ....................................346/23, 95/1.1, 355/40, 355/50

[51] Int. Cl. ....................................................G01d 13/02

[58] Field of Search ...............346/23, 107, 108, 109; 95/1.1; 355/40, 42, 50

[56] References Cited

UNITED STATES PATENTS

| | | | |
|---|---|---|---|
| 2,985,499 | 5/1961 | Riblet | 346/108 |
| 3,186,000 | 5/1965 | Sihvonen et al. | 346/109 |

*Primary Examiner*—Joseph W. Hartary
*Attorney*—David Weiss

[57] ABSTRACT

Apparatus for projecting one of at least two grid line patterns onto a moving oscillographic photosensitive record medium, without removing an included grid screen from the oscillograph. The opaque grid screen is characterized by a first plurality of transparent indicia arranged such that the light projected therethrough onto the moving surface produces thereon a first plurality of line images in predetermined spaced relation, in addition to a second plurality of transparent indicia arranged such that the light projected therethrough onto the moving surface produces thereon a second plurality of line images a predetermined number of which are disposed between successive ones of the line images of the first plurality and in predetermined spaced relation therewith. Shutter means associated with the opaque screen is provided for alternatively preventing and permitting light to be projected through the second plurality of indicia onto the moving surface, thereby permitting either the line images of both pluralities, or the line images of only the first plurality, to be recorded on the photosensitive surface.

9 Claims, 5 Drawing Figures

Rafn Stefansson,
INVENTOR.
BY.
David Weiss
ATTORNEY.

Rafn Stefansson,
INVENTOR.
BY.
David Weiss
ATTORNEY.

Rafn Stefánsson,
INVENTOR.
BY.
David Weiss
ATTORNEY.

Rafn Stefansson,
INVENTOR.
BY.
David Weiss
ATTORNEY.

MULTIPLE GRID LINE APPARATUS FOR RECORDING OSCILLOGRAPHS

BACKGROUND OF THE INVENTION

1. Field of the Invention

This invention relates to oscillography, and more particularly to a recording oscillograph having apparatus for exposing a moving photosensitive medium to produce thereon one of at least two alternative grid line patterns.

2. Description of the Prior Art

A recording oscillograph includes at least one galvanometer for transducing an electrical data signal into deflection of a light beam. A photosensitive medium, such as a photosensitive surface of a recording paper, is driven to move past the light beam such that a galvanometer trace is exposed thereon, the trace exhibiting deflection perpendicular to paper movement and proportional to the instantaneous values of the electrical data signal.

Amplitude reference lines, or "grid lines," are commonly recorded on the photosensitive surface simultaneously with the recording of the galvanometer trace, by directing an elongated band of light through transparent ruled lines in an opaque screen (such as film strip or plate) to produce a selected grid line pattern. Typically, a recording oscillograph is supplied with as many screens as desired grid line patterns. For example, one screen is conventionally utilized for producing a grid line pattern having parallel lines which are closely spaced (e.g., every 0.1 inch) for permitting high accuracy in date reduction, while another screen is utilized for producing a grid line pattern having parallel lines which are widely spaced (e.g., every 0.5 or 1 inch) for permitting greater clarity of recording.

In prior art oscillographs, the changing from one grid line pattern to another is necessarily accomplished by removing the installed grid screen from its mounting in the oscillograph, and substituting therefor a second grid screen of different grid pattern. Once a particular screen is in position and the oscillograph is recording data, it is impractical to change to a different grid pattern when the characteristics of the trace indicate that the different pattern would be more advantageously employed than the pattern then being printed.

SUMMARY OF THE INVENTION

By the present invention, one of at least two grid line patterns can be projected onto the moving photosensitive surface, without removing the grid screen from the oscillograph. The opaque screen is characterized by a first plurality of transparent indicia arranged such that the light projected therethrough onto the moving surface produces thereon a first plurality of line images in predetermined spaced relation, in addition to a second plurality of transparent indicia arranged such that the light projected therethrough onto the moving surface produces thereon a second plurality of line images a predetermined number of which are disposed between successive ones of the line images of the first plurality and in predetermined spaced relation therewith. Means associated with the opaque screen is provided for alternatively preventing and permitting light to be projected through the second plurality of indicia onto the moving surface, thereby permitting either the line images of both pluralities, or the line images of only the first plurality, to be recorded on the photosensitive surface.

In a preferred configuration of the opaque grid screen, the first indicia are transparent lines in the opaque screen which are equally spaced and relatively widely separated from one another, and arranged parallel to the direction of movement of the photosensitive paper. The second indicia are transparent lines in the opaque screen which are equally and relatively narrowly spaced within successive ones of the first plurality lines, and arranged parallel to the direction of movement of the photosensitive surface. The width of each of the lines of the first plurality can be greater than the width of the lines of the second plurality, so that the widely separated grid lines recorded on the photosensitive surface are accentuated with respect to the narrowly separated grid lines therebetween.

Shutter means are associated with the opaque grid screen for preventing projection of the second plurality line images onto the moving photosensitive surface, the shutter design being dependent upon the configuration of the grid screen. In a preferred embodiment of the present invention, for example, the transparent grid lines of the first plurality extend in length beyond the transparent lines of the second plurality, and the screen is positioned to receive light transmitted through an elongated aperture having a longitudinal axis perpendicular to the direction of the moving surface and a height which permits the light to be transmitted through at least a portion of each line of both pluralities. The shutter is interposed in the light path and has a straight edge extending perpendicular to the direction of movement of the photosensitive surface. Actuating means is provided for moving the shutter from a first position (permitting light to be transmitted through at least a portion of each transparent line of both pluralities) to a second position which completely blanks out each of the transparent lines of the second plurality and a corresponding portion (but not the complete length) of each of the transparent lines of the first plurality.

BRIEF DESCRIPTION OF THE DRAWINGS

The novel features which are believed to be characteristic of the invention, together with further advantages thereof, will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of this invention.

FIG. 3*a* is an elevation view of a preferred grid screen configuration, whereas FIGS. 3*b* and 3*c* are rear elevation views of a shutter arrangement associated with the grid screen of FIG. 3*a* and shown in operative combination therewith;

FIG. 5*a* is an elevation view of an alternative configuration of a duel grid screen in accordance with the present invention, whereas FIGS. 5*b* and 5*c* are rear elevation views of a shutter arrangement associated with the grid screen of FIG. 5*a* and shown in operative combination therewith.

DESCRIPTION OF THE PREFERRED EMBODIMENTS

Figure 1:
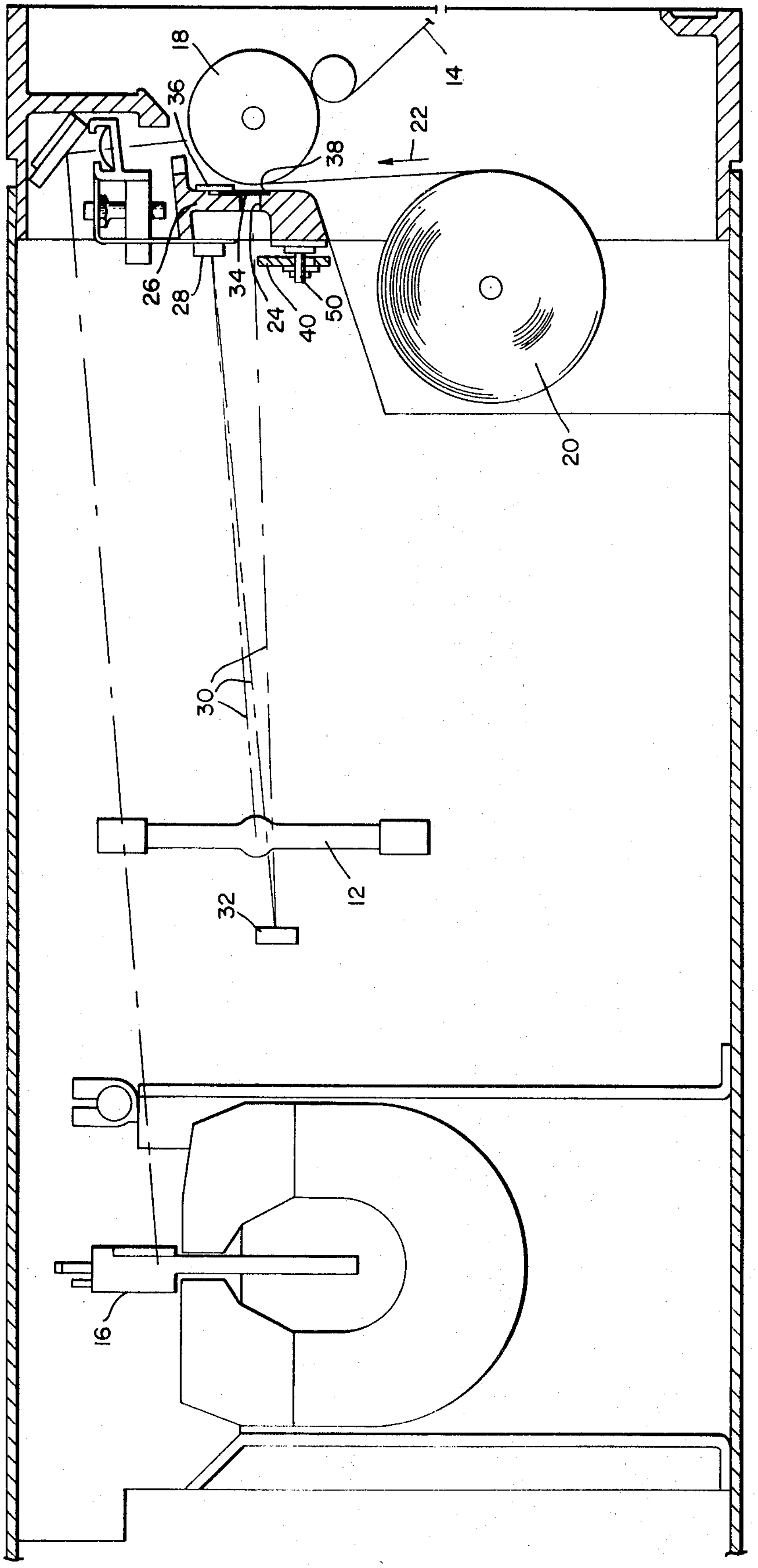
FIG. 1 is a partial sectional side view of a recording oscillograph which includes a preferred embodiment of a dual grid line apparatus according to the present invention.
Figure 2:
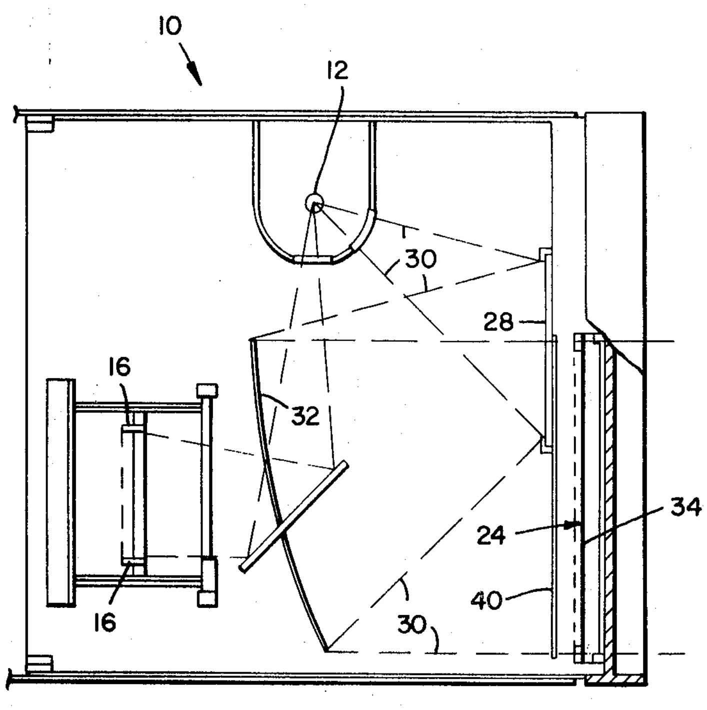
FIG. 2 is a partial sectional plan view of the oscillograph shown in FIG. 1, indicating an optical system which can be utilized with the dual grid line apparatus of the present invention.

Turning first to FIGS. 1 and 2, considered simultaneously, a recording oscillograph 10 includes a lamp 12 and accompanying optics for projecting onto a moving photosensitive medium 14 at least one light beam trace from a corresponding number of galvanometers 16. The photosensitive medium 14 is typically an oscillograph paper having a photosensitive surface upon which darkened markings are produced on portions of the surface exposed to light. The paper 14 is commonly driven by a metering roller 18 from a supply roll 20, such as in the direction of arrow 22.

Light from the lamp 12 is also directed toward an elongated aperture or slot 24 in a baffle member 26 of the oscillograph housing, the longitudinal dimension of the slot 24 disposed perpendicular to the direction of paper movement. For this purpose, a strip mirror 28 can be situated to reflect light rays 30 from the lamp 12 for a second reflection from a collimating mirror 32 and toward the slot 24. A band of light having a cross section corresponding to the slot 24 is therefore available for projection onto the photosensitive surface of the paper 14.

An opaque grid screen 34 is positioned over the slot 24, and includes transparent indicia in predetermined spaced arrangement along the longitudinal dimension of the slot 24 and which are later described in greater detail. The grid screen 34 can be secured to the baffle 26 and in registration with the slot 24 by means of a retainer plate 36 and a registration step 38.

An elongated shutter 40 is positioned parallel to the longitudinal dimension of the slot 24, and shutter-actuating means (not shown) is provided for actuating the shutter to assume two alternative positions. When in the first of these positions, the shutter 40 permits light to be transmitted through at least a portion of each of the transparent indicia of the grid screen 34, for exposing the moving photosensitive paper 14 in such manner as to produce thereon a first grid line pattern. When in the second of these positions, the shutter 40 intercepts portions of the light path associated with preselected ones of the transparent indicia (but not preselected others of the transparent indicia), for exposing the moving photosensitive paper 14 to produce thereon a second grid line pattern.

Figure 3:
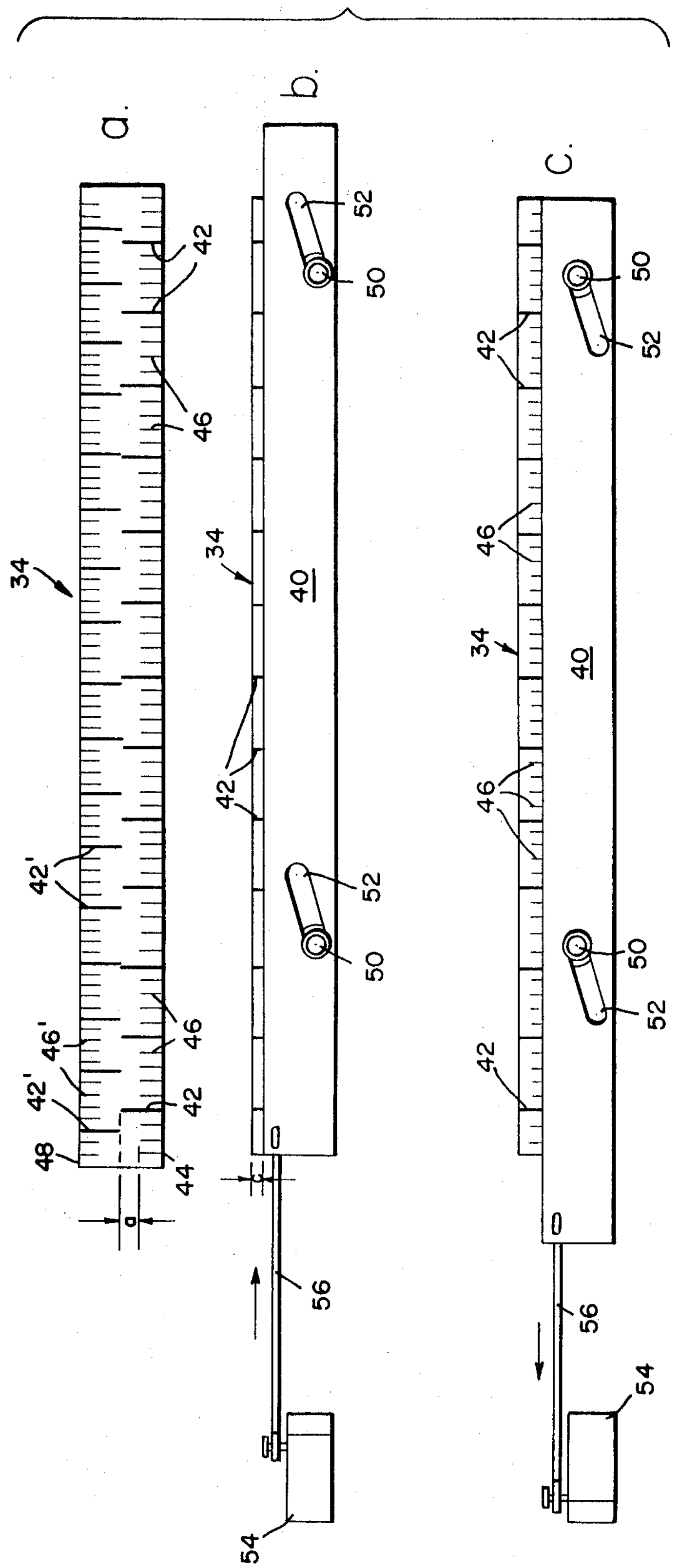

Turning next to FIG. 3*a*, a preferred configuration of the grid screen 34 comprises an opaque plate or film strip having a first plurality of parallel transparent lines 42, each of the lines 42 being perpendicular to the longitudinal dimension of the film strip 34. The transparent lines 42 of the first plurality are arranged in equally spaced relation along the longitudinal dimension of the film strip 34, and are preferably of equal length extending from a longitudinal edge 44 of the film strip 34.

A second plurality of parallel transparent lines 46 are arranged on the film strip 34 perpendicular to its longitudinal dimension, a predetermined number of which are disposed between successive ones of the transparent lines 42 of the first plurality and in equally spaced relation with the first plurality lines 42. The second plurality lines 46 are preferably of equal length extending from the film strip edge 44, but shorter than the length of the first plurality lines 42 such that a rectangular area having a height a extends across the longitudinal dimension of the film strip 34 which includes portions of each of the transparent lines 42 of the first plurality but does not include a portion of any of the transparent lines 46 of the second plurality.

The width of each of the transparent lines 42 of the first plurality is distinguishably greater than the width of each of the transparent lines 46 of the second plurality. Accordingly, when the moving photosensitive paper is exposed by light which is transmitted through the transparent lines 42, 46 of both pluralities, the resulting grid lines corresponding to the first plurality of transparent lines 44 are accentuated with respect to the resulting grid lines corresponding to the second plurality lines 46.

In the example of the dual grid line pattern shown, the spacing between successive transparent lines 42 of the first plurality is 0.5 inch, and the spacing between successive transparent lines 42, 46 of both pluralities is 0.1 inch. If desired, the film strip 34 can further include a second dual grid line pattern extending from the opposite longitudinal edge 48 and comprising two pluralities of transparent lines 42′, 46′, correspondingly arranged as described above except that the spacing between successive lines 42′, 46′ conform to the metric system, i.e., the spacing between the longer lines 42′ can be 1.0 centimeter and the spacing between the shorter lines 46′ can be 0.2 centimeter.

Figure 4:
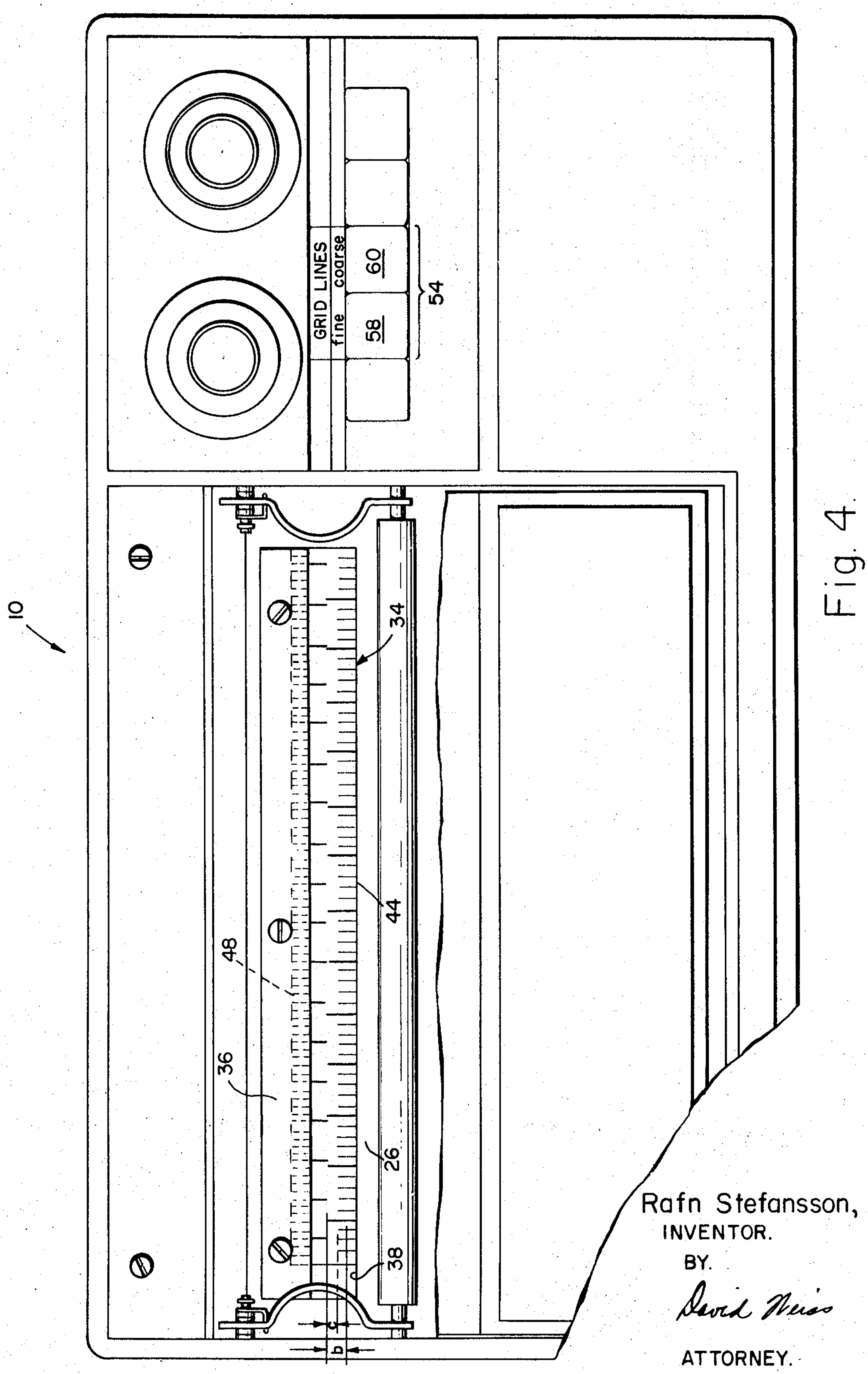
FIG. 4 is a front elevation view of the oscillograph shown in FIG. 1, wherein the preferred configuration of the grid screen shown in FIG. 3*a* is installed therein.

Turning to FIG. 4, the film strip 34 is shown installed in the oscillograph 10, the edge 44 being positioned on the registration step 38 of the baffle 26 and the film strip 34 secured to the baffle by means of the removable retainer plate 36. The film strip 34 completely covers the slot 24 (not shown), the slot 24 having a length slightly less than the longitudinal dimension of the film strip 34 and a height b located with respect to the film strip 34 as shown in FIG. 4. If the metric-spaced grid line pattern is desired, the film strip 34 would be installed in a position inverted to that shown in FIG. 4; i.e., the film strip edge 48 would be supported by the registration strip 38 of the baffle 26.

The respective areas of light illuminating the film strip 34 when the shutter 40 assumes its two alternative positions are shown in FIGS. 3*b* and 3*c*. In FIG. 4*b*, the illuminated height *c* is equal to or less than the difference in height a (FIG. 3*a*) between the lengths of the transparent lines 42, 46, and positioned entirely within the height *a*. Accordingly, light is transmitted only through the transparent lines 42 of the first plurality, so that the grid line pattern exposed on the moving photosensitive paper has spacings of 0.5 inch in the example shown.

The second position of the shutter 40 is shown in FIG. 3*c*, and the height of the illuminated area of the film strip 34 is increased such that portions of each of the transparent lines 46 of the second plurality are illuminated in addition to portions of each of the lines 42 of the first plurality. When the shutter 40 is in this position, the illuminated height is equal to or slightly less than the height *b* of the slot 24.

The shutter 40 is moved from one position to the other by a vertical movement thereof, which can be accomplished by laterally moving the shutter 40 which is supported by a pair of pins 50 secured to the oscillograph housing in cooperation with a pair of angularly disposed elongated apertures 52 in the shutter 40. Such lateral movement can be actuated by means of a two-position mechanical switching device 54, for actuating the shutter 40 into its two alternative positions through a coupling wire 56. For example, a suitable switching device 54 is a two-station mechanical portion of a switching unit manufactured by Switchcraft, Inc., and sold under the designation "Multi-Switch" Series 35000. As shown in FIG. 4, the switching device can be located on the front panel of the oscillograph 10, and appears as a pair of pushbuttons 58, 60. Depressing the first push button 58 will cause the shutter 40 to be actuated into the position shown in FIG. 3*c* (producing a "fine" grid line pattern), while depressing the second pushbutton 60 will actuate the shutter 40 into the position shown in FIG. 3*b* (producing a "coarse" grid line pattern).

As an alternative to providing the shutter 40, the film strip 34 can be actuated to move alternatively up and down, in which case the height of the slot 24 would be equal or less than the illustrated height c.

Figure 5:
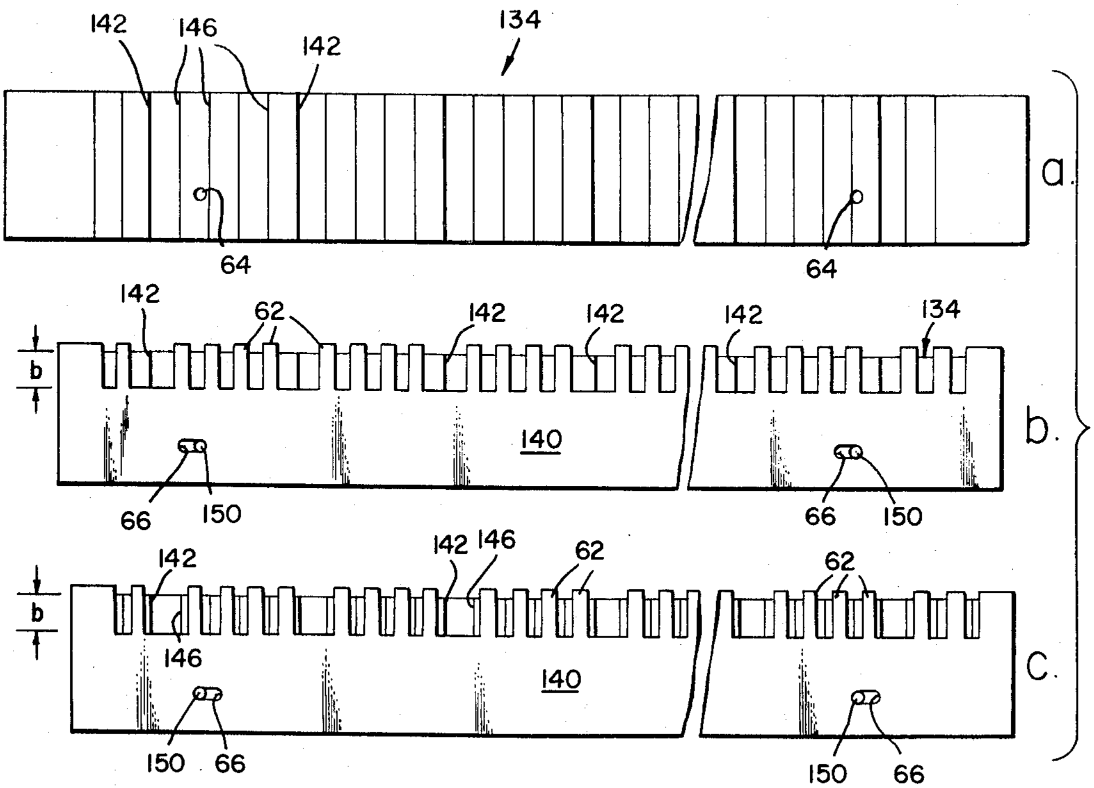

Turning to FIG. 5*a*, an alternative configuration of a dual grid line screen 134 comprises an opaque film strip including a first plurality of parallel transparent lines 142 in equally spaced arrangement, and a second plurality of parallel transparent lines 146 disposed between successive lines 142 of the first plurality and equally spaced with respect to the transparent lines 142 of the first plurality. The lengths of the transparent lines 142, 146 can extend between the longitudinal edges of the film strip 134.

As shown in FIG. 5*b*, a shutter 140 is superposed on the film strip 134, and includes a plurality of "teeth" 62 which are arranged for alignment with the transparent lines 146 of the second plurality only. When so aligned, the teeth 62 of the shutter 140 intercept the light associated with the lines 146, permitting light to be transmitted only through portions of the transparent lines 142 of the first plurality. The height of the teeth 62 is equal to or greater than the height of the slot 24 (not shown), and the film strip 134 can be maintained in registration with the shutter 140 and with the slot 24 by means of pins 150 secured to the oscillograph housing and in registration with film strip mounting apertures 64 and laterally elongated shutter apertures 66.

When the shutter 140 is actuated to laterally move to the right as shown in FIG. 5*c*, a portion of each of the transparent lines 142, 146 of both pluralities intercept the light path, and light is transmitted therethrough to produce the "fine" grid line pattern on the moving photosensitive paper.

Thus, there have been shown two preferred embodiments of apparatus utilizable in a recording oscillograph, for exposing a moving photosensitive medium to produce thereon one of two alternative grid patterns without necessitating a removal of the grid screen from the oscillograph. Other embodiments of the present invention and modifications of the embodiments herein presented may be developed without departing from the essential characteristics thereof.

For example, although the two grid screen configurations shown in the drawings will produce grid line patterns having equally spaced lines, a grid screen having logarithmic spacing of lines of each of the two pluralities of lines are included within the scope of the present invention. Accordingly, the invention should be limited only by the scope of the claims appended below.

What is claimed is:

1. Apparatus for exposing a moving photosensitive surface to produce one of a plurality of alternative grid line patterns thereon, comprising the combination of:
 a light source for projecting light onto the photosensitive surface;
 an opaque screen interposed between said source and the photosensitive surface, said opaque screen including
  a first plurality of transparent indicia arranged such that light projected therethrough onto the moving surface produces thereon a first plurality of line images in predetermined spaced relation and
  a second plurality of transparent indicia arranged such that light projected therethrough onto the moving surface produces thereon a second plurality of line images a preselected number of which are disposed between successive ones of the line images of said first plurality and in predetermined spaced relation therewith; and
 means associated with said opaque screen for permitting light from said source to be projected through said first plurality of indicia onto the moving surface while preventing and alternatively permitting light from said source to be projected through said second plurality of indicia onto the moving surface.

2. The apparatus in accordance with claim 1 wherein the indicia of said first plurality of indicia are distinguishable from the indicia of said second plurality of indicia such that the images of said first plurality of images are distinguishable from the images of said second plurality of images.

3. In a recording oscillograph including means for projecting a band of light toward a moving photosensitive surface and perpendicular to the direction of movement of the surface, apparatus for exposing the surface to produce thereon one of a plurality of alternative grid line patterns, comprising in combination:
 an opaque screen having a longitudinal dimension and positionable for intercepting the band of light, said opaque screen including
  a first plurality of transparent lines arranged parallel to the direction of movement of the surface and in predetermined spaced relation along said longitudinal dimension and
  a second plurality of transparent lines arranged parallel to the direction of movement of the surface, a preselected number of which are disposed between successive ones of the lines of said first plurality in predetermined spaced relation therewith along said longitudinal dimension; and
 shutter means for permitting portions of said band of light to be transmitted through the lines of both of said pluralities and actuable for intercepting portions of the band of light corresponding to the lines of said second plurality only.

4. The apparatus in accordance with claim 3 wherein the lines of said first plurality have greater width than the lines of said second plurality.

5. The apparatus in accordance with claim 3 wherein the lines of both of said pluralities are arranged along said longitudinal dimension in equally spaced relation.

6. In a recording oscillograph, apparatus for exposing a moving photosensitive surface to produce thereon one of a plurality of alternative grid line patterns, comprising the combination of:
 a light baffle having an elongated aperture therein, the longitudinal dimension of said aperture being perpendicular to the direction of movement of the photosensitive surface;
 a lamp;
 optical means for directing light from said lamp throughout said aperture and toward the photosensitive surface;
 an opaque screen positionable throughout the aperture, said opaque screen including
  a first plurality of transparent lines arranged parallel to the direction of movement of the surface and in predetermined spaced relation along said longitudinal dimension and
  a second plurality of transparent lines arranged parallel to the direction of movement of the surface, a preselected number of which are disposed between successive ones of the lines of said first plurality in predetermined spaced relation therewith along said longitudinal dimension; and
 a shutter interposable in a portion of the light path associated with said elongated aperture and corresponding to the lines of said second plurality, said shutter being movably mounted to said baffle in one of two alternative positions, a first of said positions permitting light associated with said aperture to be transmitted through the lines of both of said pluralities, and a second of said positions permitting light associated with said aperture to be transmitted through the lines of said first plurality only.

7. The apparatus in accordance with claim 6 further including actuating means for alternatively actuating said shutter into said first and second positions.

8. The apparatus in accordance with claim 6 wherein the lines of said first plurality have greater width than the lines of said second plurality.

9. The apparatus in accordance with claim 6 wherein the lines of both of said pluralities are arranged along said longitudinal dimension in equally spaced relation.

* * * * *